United States Patent [19]
Chen

[11] Patent Number: 5,870,019
[45] Date of Patent: *Feb. 9, 1999

[54] REMOTE CONTROL VEHICLE SECURITY SYSTEM ISSUING IN OVERRIDE RE-ARM FEATURE

[75] Inventor: Michael Chen, Taipei, Taiwan

[73] Assignee: Advance Security Inc., Taipei Hsien, Taiwan

[ * ] Notice: This patent issued on a continued prosecution application filed under 37 CFR 1.53(d), and is subject to the twenty year patent term provisions of 35 U.S.C. 154(a)(2).

[21] Appl. No.: 728,175

[22] Filed: Oct. 9, 1996

[51] Int. Cl.$^6$ ................................... B60R 25/10
[52] U.S. Cl. ................ 340/426; 340/425.5; 340/430; 307/10.3
[58] Field of Search ............... 340/425.5, 426, 340/428, 430; 180/28 H, 287, 289; 307/10.2, 10.3, 10 H

[56] References Cited

U.S. PATENT DOCUMENTS

| | | | |
|---|---|---|---|
| 3,956,732 | 5/1976 | Teich | 340/430 |
| 4,706,064 | 11/1987 | Hwang | 340/430 |
| 4,975,678 | 12/1990 | Hwang | 340/426 |
| 4,980,666 | 12/1990 | Hwang | 340/428 |
| 5,117,217 | 5/1992 | Nykerk | 340/426 |
| 5,287,006 | 2/1994 | Carlo et al. | 307/10.3 |
| 5,319,351 | 6/1994 | Breezley | 340/426 |
| 5,397,925 | 3/1995 | Carlo et al. | 307/10.3 |
| 5,444,430 | 8/1995 | McShane | 340/426 |
| 5,473,305 | 12/1995 | Hwang | 340/426 |
| 5,486,806 | 1/1996 | Firari et al. | 340/426 |
| 5,515,043 | 5/1996 | Berard et al. | 340/426 |
| 5,543,776 | 8/1996 | L'Esperance et al. | 340/426 |

*Primary Examiner*—Jeffrey A. Hofsass
*Assistant Examiner*—Van T. Trieu
*Attorney, Agent, or Firm*—Browdy and Neimark

[57] ABSTRACT

An improved remote control vehicle security system performing an override re-arm function enables a disarmed security system in which siren alarming, parking light flashing and other sensor trigger system and etc. are stopped to function for a preset period of time, such as 30 seconds, if no further input to cancel the override re-arm is given within the preset period of time, the system will resume an armed state automatically.

5 Claims, 5 Drawing Sheets

REMOTE CONTROL VEHICLE SECURITY SYSTEM ISSUING IN OVERRIDE RE-ARM FEATURE

BACKGROUND OF THE INVENTION

The present invention relates to an improved remote control vehicle security system having a capability of performing an override re-arm function.

First, it is necessary to give a brief explanation for the word of "override" which is a common term used in the field of remote control vehicle security systems. As a user of a remote control vehicle security system, a person must employ a remote control device to effect arm/disarm operations on a security system. However, in case the remote control device of a vehicle is lost or forgotten to be brought along with the owner of this vehicle or out of order and the security system is put in an armed state, the legal owner or user of this vehicle has to take a proper procedures without the remote control device to get the system disarmed. Such kind of procedure is called "override".

Almost all remote control vehicle security systems have a hidden override switch that permits the legal user of a security system to turn off the alarm of or to disarm an on-guard security system. So, a break-in burglar can easily turn off the alarm of a remote control vehicle security system in the following steps:
1. Switch the ignition key to "on" position.
2. Locate the hidden override switch. (For a professional burglar, he can find the switch in seconds.)
3. Flip the override switch. and steal the vehicle without causing any interference.

The inventor got his idea of making improvement on the prior art remote control vehicle security system from a conventional radio frequency operated re-arm system.

It is well known that in a conventional remote control vehicle security system, a transmitter is used as a remote control device. When the transmitter's button is pressed, it will transmit a specific code in radio frequency to effect the arm or disarm operations on the security system. In case the legal user accidentally press the transmitter's button and get the system disarmed without his knowledge, his or her vehicle might get stolen as a result of such ignorance. To prevent such situations from happening, manufactures of vehicle security systems developed a RF (Radio Frequency) re-arm function so as to resolve such kind of problem.

The RF re-arm function is briefly described as follows: If a legal user accidentally press the transmitter's button and get the system disarmed and the ignition switch is not turned on within 30 or 60 seconds, the system will automatically be re-armed again after the preset duration.

The present invention provides an override re-arm function for a remote control vehicle security system. Such override re-arm function is related to the idea of RF re-arm disclosed in the prior art. In the present invention, when a vehicle security system is disarmed, the alarming activities including siren alarming, parking light flashing and other sensor trigger systems all stop functioning and the security system will count down 30 seconds automatically and wait for further instructional input to cancel the override re-arm. If within the pre-set time duration, i.e., 30 seconds, no valid instruction is input, the security system will automatically resume an armed state.

SUMMARY OF THE INVENTION

The primary object of the present invention is to provide an improved remote control vehicle security system which has an override re-arm function so that such security system will automatically re-arm in an override state if no procedures to cancel the system re-arm is taken within a preset time duration.

DETAILED DESCRIPTION OF THE PREFERRED EMBODIMENT

Figure 1:
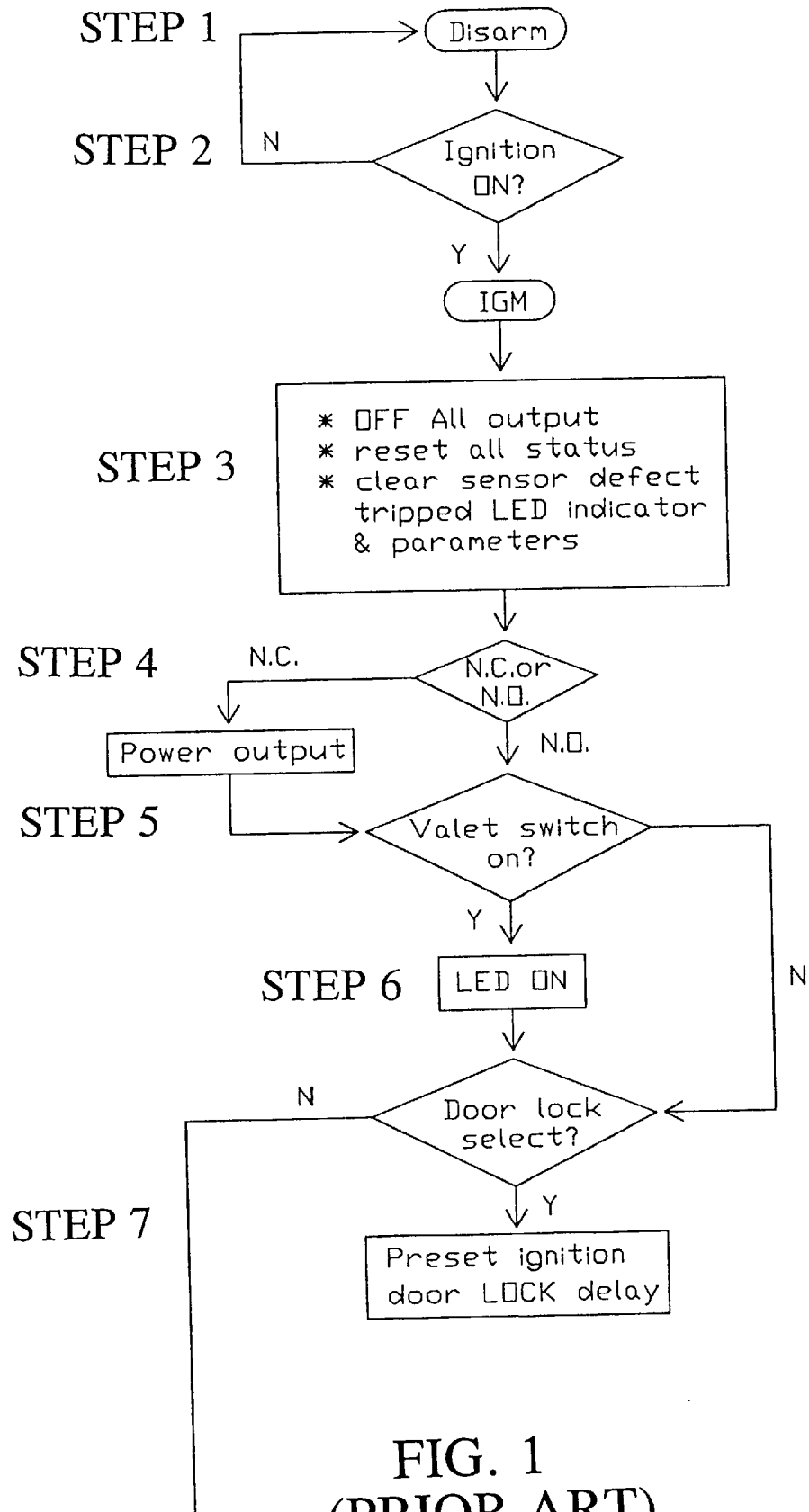
FIGS. 1, 2, 3, 4 are the flow charts illustrating the operational procedures of the override re-arm function of a conventional remote control vehicle security system.

Referring to FIG. 1, the operational flow chart of a conventional remote control vehicle security system as well as part of the Present invention is illustrated. The override re-arm procedures will be clearly illustrated in FIG. 5. Beginning with the brief accounts of the flow chart of FIG. 1 by way of the following description:
Step 1: how to enter the override re-arm program.
Step 2: check if the ignition is turned on or off.
Step 3: if turned on, cut off all outputs, reset all status, clear sensor defects, tripped LED indicator & parameters.
Step 4: check if the circuit of a starting motor is in a normal closed or normal open status.
Step 5: if it is in a normal open status, then check if a valet switch which is a hidden lock is set in an on or off position.
Step 6: if the valet switch is on, then check if the LED is turned on or off.
Step 7: door lock select, if yes, preset ignition doorlock delay timer 2 seconds.

The above steps illustrate the conventional process of a remote control vehicle security system. These step have been further developed to include the following steps illustrated in FIGS. 2, 3, 4 to make such vehicle security system more "smart" or capable in dealing with different situations.

Figure 2:
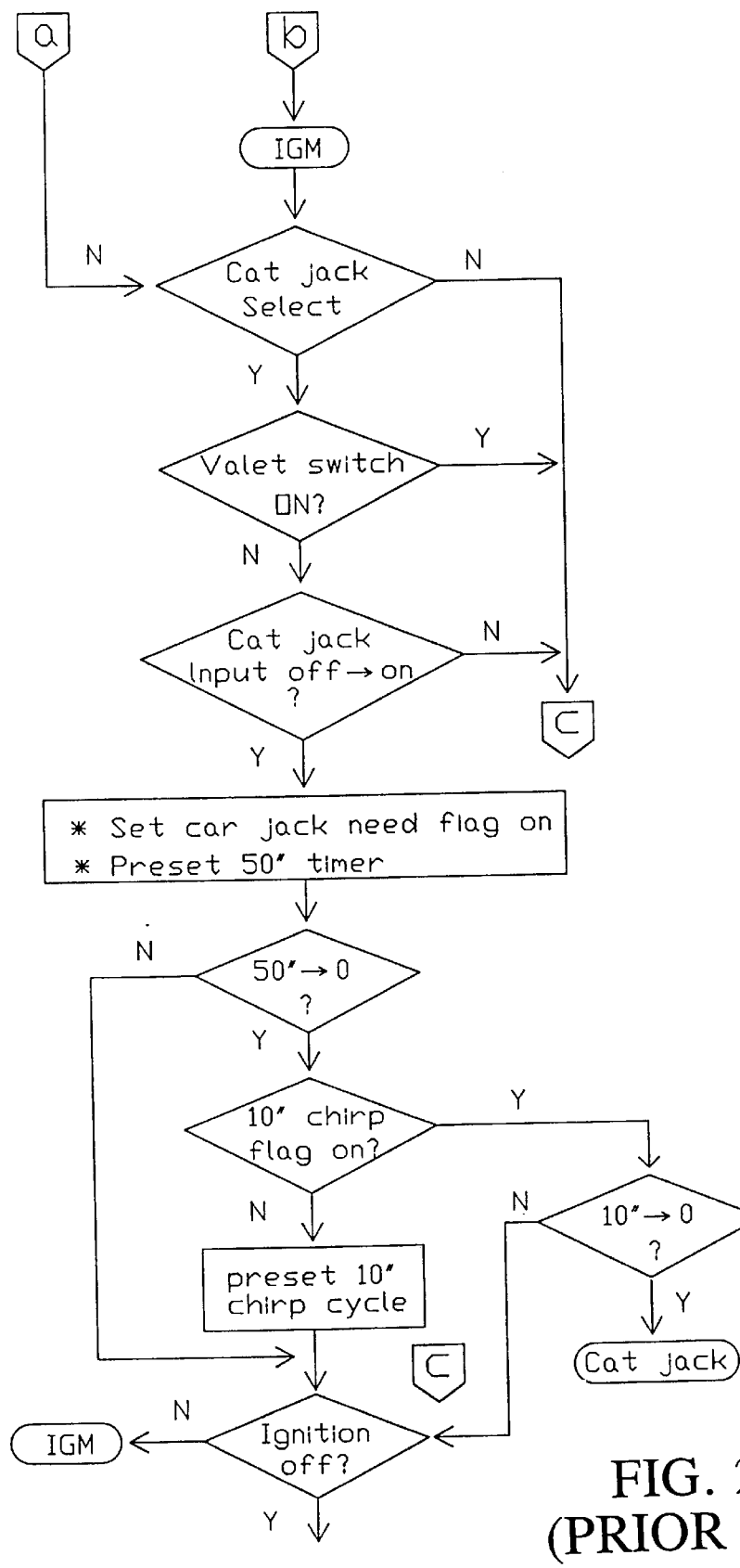
Figure 3:
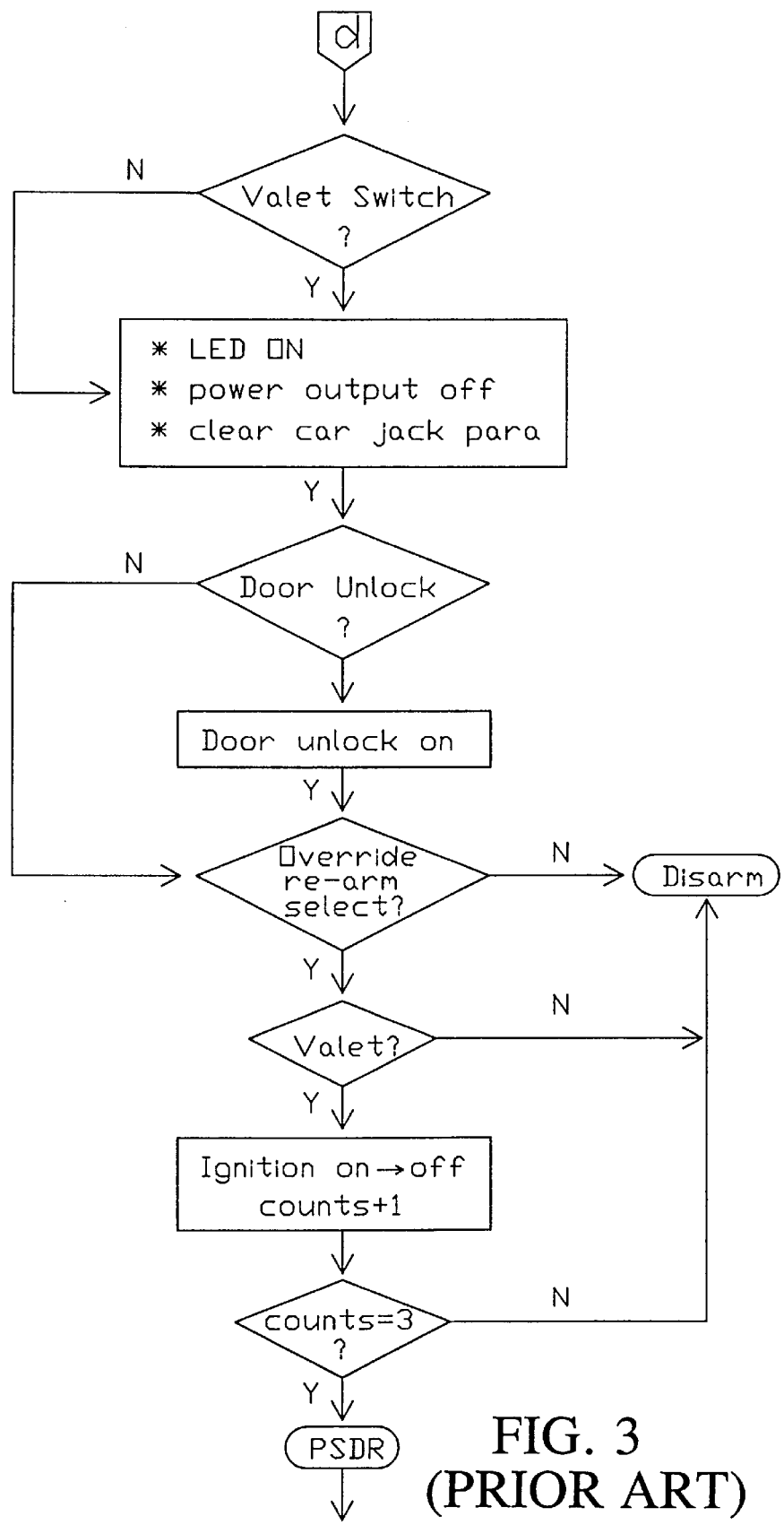
Figure 4:
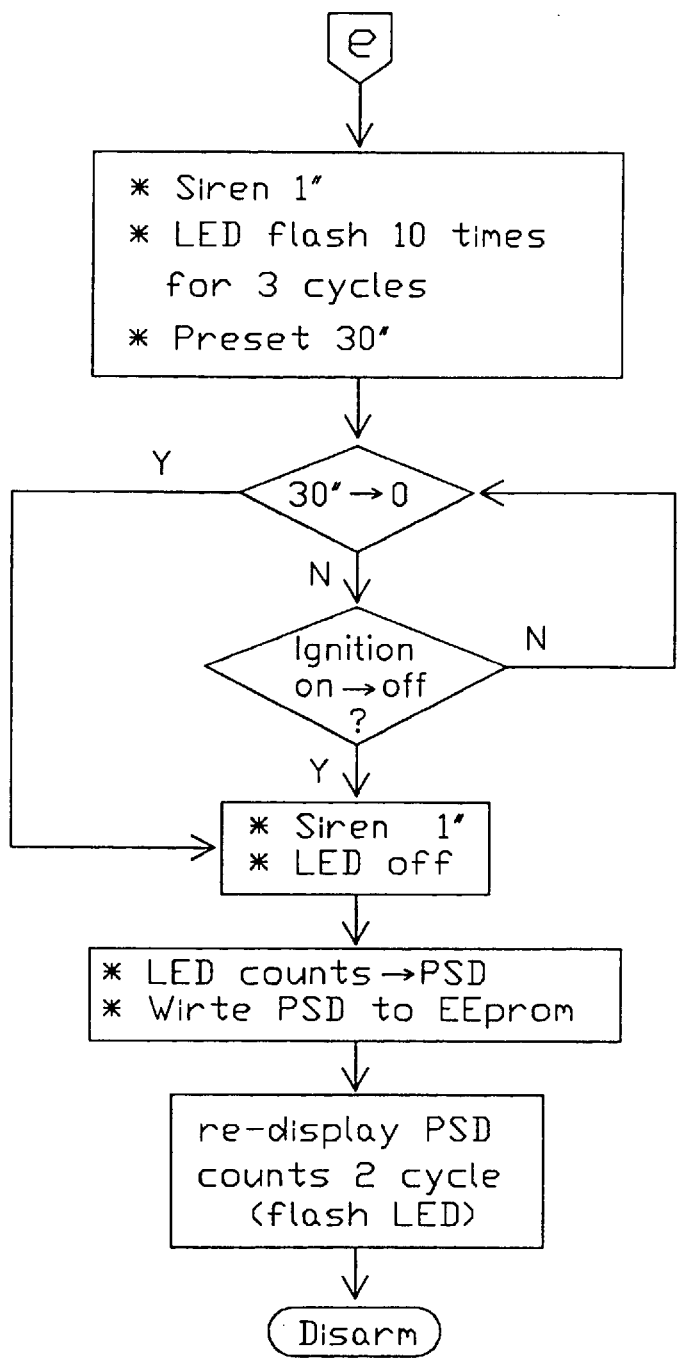

Referring further to FIGS. 2, 3, 4 these diagrams present the flow charts of further features of the conventional remote control vehicle security system and are well known, so that it is not necessary to go into further details or explanation of these features. The essence of the present invention is well disclosed in FIG. 5.

Figure 5:
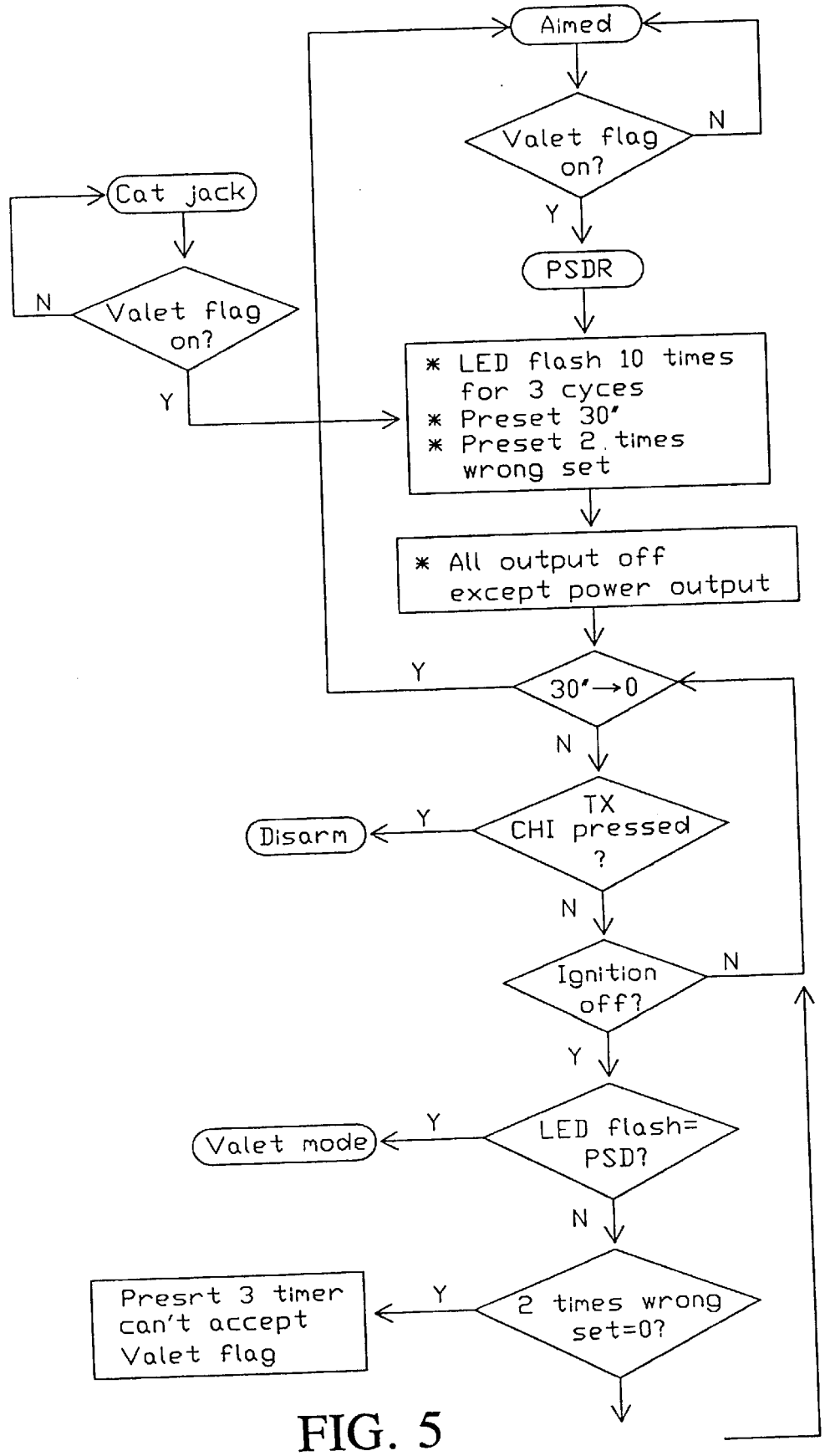
FIG. 5 is the flow chart of the override re-arm of the present invention.

The override re-arm feature of the present invention is set out in the stepwise flow chart of FIG. 5. In the flow chart of FIG. 5, the override re-arm feature is given a pre-set period of time and if no instructional input is received, the vehicle security system will resume an armed state automatically.

An override re-arm feature as provided for in the claimed system will automatically re-arm in override condition, if a legal user does not take certain procedures to cancel the system re-arm. This override re-arm feature acts in the following manner: when the operator wishes to temporarily move from arm to disarm:
1. When the vehicle's door is opened system's siren will sound, the parking lights will flash, and the vehicle cannot be started.
2. The operator uses the correct ignition key and turn the ignition switch to "on" position.
3. The operator turns the override switch on then off.

When the above procedures are completed, the system disarmed with the system's siren stopped and the parking lights not flashing and, other sensors stopped triggering system. However, these procedures reserves power output (usually connected to starter). To enter override re-arm:

(Re-arm timer 30 seconds) When the system is disarmed by the operator, the LED starts flashing, indicating that the system is entering override re-arm. To cancel the override re-arm: The operator waits until the LED flashes a specific number of times, then turns the ignition key to the "off" position to get the override re-arm cancelled. The operator must make sure to turn the ignition key off after the LED flashes the correct number within 30 seconds. If the operator fails to turn the ignition key off within 30 seconds the system will automatically be re-armed. The specific number is set from 1 to 10, as determined from the number of flashes of the LED. A legal user can selectively set the number by way of the program as he wishes. If someone turns the ignition key off at a wrong number, the system allows him to make 2 mistakes. If the third input is still incorrect, it will be shut down for 3 minutes. During the period the system will not accept any correct number, and when the time is up, it will be re-armed again with sirens chirping and parking lights flashing, LED flashing, door locked and activating sensors to guard the vehicle.

I claim:

1. A remote control vehicle security system for use in a vehicle, said security, system comprising:

alarms including sirens and flashing lights activated by an unauthorized entry into the vehicle, override re-arm means for temporarily disarming activation of said security system, wherein said override re-arm means is temporarily disarmed by turning on an ignition of said vehicle, said override re-arm means including count-down means for automatically counting down a preset period of time, after said override re-arm means has been temporarily disarmed, said preset period of time displayed by an indicator light which flashes a predetermined number of times chosen by an authorized operator, after said override re-arm means has been temporarily disarmed, said security system further having means for cancelling the override re-arm means when activated after reaching said predetermined number of flashes, wherein, if said means for cancelling is not turned off after reaching said predetermined number of flashes said system resumes an armed condition.

2. The security system of claim 1, wherein said indicator light is a LED.

3. The security system of claim 1, wherein said system resumes an armed condition after reaching said predetermined number of flashes unless said means for cancelling is turned off in 30 seconds.

4. The security system of claim 1 wherein said means for cancelling comprises turning an ignition key of the vehicle off after reaching said predetermined number of flashes.

5. The security system of claim 4, wherein said system resumes an armed condition if an operator incorrectly turns the ignition key off three times before reaching the predetermined number of flashes.

* * * * *